(12) United States Patent
Nazarian

(10) Patent No.: US 6,388,829 B1
(45) Date of Patent: May 14, 2002

(54) HIGH SERVO SAMPLING DISK DRIVE WITH MINIMUM OVERHEAD

(75) Inventor: Ara W. Nazarian, Tustin, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/364,744

(22) Filed: Jul. 30, 1999

(51) Int. Cl.[7] .............................. G11B 5/09; G11B 5/596
(52) U.S. Cl. ........................ 360/48; 360/77.08; 360/60
(58) Field of Search .............................. 360/48, 77.08, 360/60, 75, 77.02, 78.04

(56) References Cited

U.S. PATENT DOCUMENTS

| | | |
|---|---|---|
| 5,784,219 A | 7/1998 | Genheimer |
| 5,986,847 A * | 11/1999 | Le et al. ............... 360/77.08 X |
| 6,091,564 A * | 7/2000 | Codilian et al. ............... 360/75 |

* cited by examiner

Primary Examiner—Andrew L. Sniezek
(74) Attorney, Agent, or Firm—Milad G Shara

(57) ABSTRACT

A disk drive having multi-burst servo wedges and single-burst servo wedges for improving shock performance with less impact on data space than otherwise possible and a method of increasing the servo sampling rate for effecting reasonable shock detection in such a disk drive using such multi-burst and single-burst servo wedges. The additional single-burst servo wedges may contain certain desired servo wedge fields, or may consist of just the servo burst itself. In operation, the multi-burst and single servo wedges are processed in series. The multi-burst servo wedge is read to develop a position error signal and control the head, and the single-burst servo wedge is read, the single burst amplitude is compared to one of the plurality of burst amplitudes and, if the single burst amplitude differs by more than a predetermined threshold amount from the one previous burst amplitudes, the system aborts a data write operation.

34 Claims, 8 Drawing Sheets

HIGH SERVO SAMPLING DISK DRIVE WITH MINIMUM OVERHEAD

BACKGROUND OF THE INVENTION

1. Field of the Invention

The present invention relates generally to magnetic disk drives (disk drives), and more particularly to an efficient servo format that provides an increased servo sampling rate with minimal overhead.

2. Description of the Related Art

A conventional disk drive has a head disk assembly (HDA) including at least one disk, a spindle motor for rapidly rotating the disk, and a head stack assembly (HSA) for supporting a transducer head over the rotating disk. The servo control system uses "servo information" recorded on the disk to position the head for reading and writing. The servo information most notably includes groups of magnetic transitions or "bursts" that are recorded in a radially displaced fashion within two angularly successive servo burst regions. In the simplest pattern of servo bursts, where only two bursts are used, they are usually designated as the "A" burst and the "B" burst. The radial displacement in such case places the "A" burst to one side of a burst pair centerline and the "B" burst to the other side. The "A" and "B" bursts are angularly displaced from one another since they are contained in angularly successive servo burst regions. Accordingly, the head passes over the "A" burst and then over the "B" burst. If the head is aligned with the burst pair centerline, then the head will pass over equal amounts of the "A" and "B" bursts and the servo control will develop a position error signal (PES) equal to zero. If the head is displaced from the centerline, then the head will pass over more of the "A" burst or over more of the "B" burst so that the PES will be nonzero, the sign of the PES indicating the direction of displacement. The servo information is most commonly embedded at equally spaced intervals in a data track and "sampled" at a sampling rate which is determined by the spacing and rotation rate of the disk. The servo information occupies space, therefore, that could otherwise contain data.

One prior effort at reducing the spaced taken by the servo data is disclosed in U.S. Pat. No. 5,784,219 ('219 patent) authored by Genheimer, issued to Seagate Technology, Inc. on Jul. 21, 1998, and entitled DUAL SERVO FORMAT FOR OPTIMUM EFFICIENCY AND OFF-TRACK DETECTION. As suggested by its title, the '219 patent discloses a "dual servo format" of "large" servo wedges having four bursts (ABCD) and "small" servo wedges having only two bursts (AB). The '219 patent even taught that its small servo wedges might only contain the two bursts (AB), eliminating the remaining servo information normally found in a servo wedge (e.g. synchronization fields, track identification fields, and sector identification fields). The '219 patent, however, was focused on defining a stand-alone burst pair centerline in its servo wedges, even its small ones. The '219 patent's small servo wedges, therefore, always include an "A" burst and a "B" burst that consumed data space.

The disk drive market is extremely competitive. Disk drive makers are continually striving for servo patterns that most effectively address the competing goals of increasing the available storage capacity (by providing less servo information) and enhancing performance (by providing more servo information). There remains a need, therefore, for a disk drive with a servo pattern that provides a more optimal solution to reducing the area occupied by the servo information while increasing the servo sampling frequency for purposes of shock protection, track following, or both.

SUMMARY OF INVENTION

In a first aspect, the invention may be regarded as a disk drive having a disk wherein the disk has a plurality of concentric tracks, each track comprising: a first servo sector; a second servo sector; and a first data region disposed between the first and second servo sectors; the first servo sector comprising: a synchronization field for establishing gain and frequency settings; a track identification field; and a plurality of servo bursts for position control; and the second servo sector comprising a single servo burst disposed in a predetermined alignment relative to one of the plurality of servo bursts in the first servo sector.

In a second aspect, the invention may be regarded as a method of more frequent servo sampling to improve shock performance while track following in a disk drive having a transducer and a disk with a plurality of concentric tracks wherein each track has a plurality of sequentially active interspersed first and second servo sectors wherein the servo sectors are separated by a data region, the method comprising the steps of: reading a track identification field from the first servo sector; reading a plurality of burst amplitudes from the first servo sector; calculating a position error signal from the track identification field and the plurality of burst amplitudes; providing a correction signal from the calculated position error signal; reading a single burst amplitude from the second servo sector; comparing the single burst amplitude to one of the plurality of burst amplitudes; and if the single burst amplitude differs by more than a predetermined threshold amount from the one of the plurality of burst amplitudes, aborting a current disk data transfer operation.

BRIEF DESCRIPTION OF THE DRAWINGS

The just summarized invention may best be understood with reference to the Figures of which.

DETAILED DESCRIPTION

The invention is a disk drive that, in additional to having regular servo wedges, has even more single burst servo wedges that collectively provide a higher servo sampling rate for identifying rapid head position changes due to shock events, providing additional track following information beyond that which is normally available, or both, at minimal cost with regard to data storage capacity.

Figure 1:
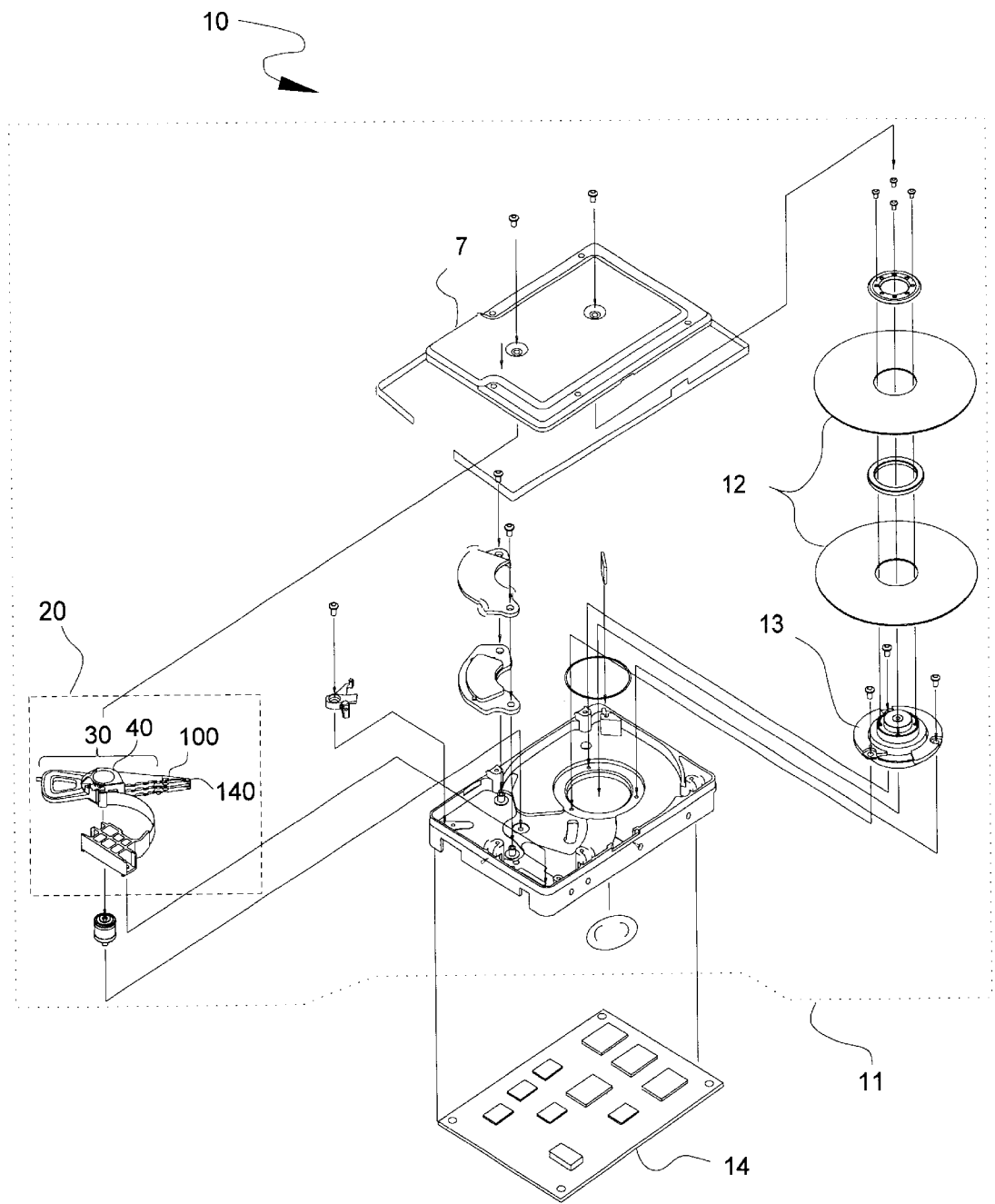
FIG. 1 is an exploded perspective view of a magnetic disk drive 10 having a head disk assembly 11 ("HDA") including a head stack assembly 20 ("HSA") which carries a transducer head 140 over data tracks and associated servo bursts on the surface of a disk 12.

FIG. 1 shows the principal components of a disk drive 10 that operates with servo information written according to this invention. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly (HSA) 20 located next to the disk 12. The HSA 20 shown comprises a swing-type actuator assembly 30 that has at least one head gimbal assembly (HGA) 100 which carries a read/write head 140. The preferred read/write head 140 is a magnetoresistive head (MR head) that has an inductive write transducer and a separate, magnetoresistive (MR) read transducer, but other head technologies may be used.

The disk drive 10 is ultimately used to store user data in one or more "data tracks" (not shown) on the surface of its disks 12. Such data tracks are most commonly arranged as a plurality of concentric data tracks, but some disk drives have used a spiral data track. In either case, special servo information is recorded on at least one disk surface so that the disk drive's servo control system may control the actuator, via the VCM, to accurately position the transducer head to read or write user data to or from the data tracks. In colloquial terms, the servo information provides the servo control system with the "your head is here" data it needs to find ("seek") and then hold ("track follow") a desired head position. In operation, the disk drive's servo control system intermittently or continuously processes (read only) the pre-recorded servo information just before or while the disk drive processes (reads or writes) user data in the data tracks.

The servo information is factory recorded at the time of manufacture using a manufacturing fixture called a servo track writer (STW). The STW records the servo information in special "servo tracks" on each surface of each disk, or on one dedicated disk, for later use by the servo control system when the drive is in the hands of the user. The servo tracks are generally used throughout the life of the disk drive without modification.

Earlier disk early drives used a "dedicated servo" system where one head and one disk surface provide the servo information for all of the other heads and disk surfaces. The industry presently prefers an "embedded servo" system, however, where the servo information is interspersed amongst the data on each surface of each disk as shown in FIG. 2.

Figure 2:
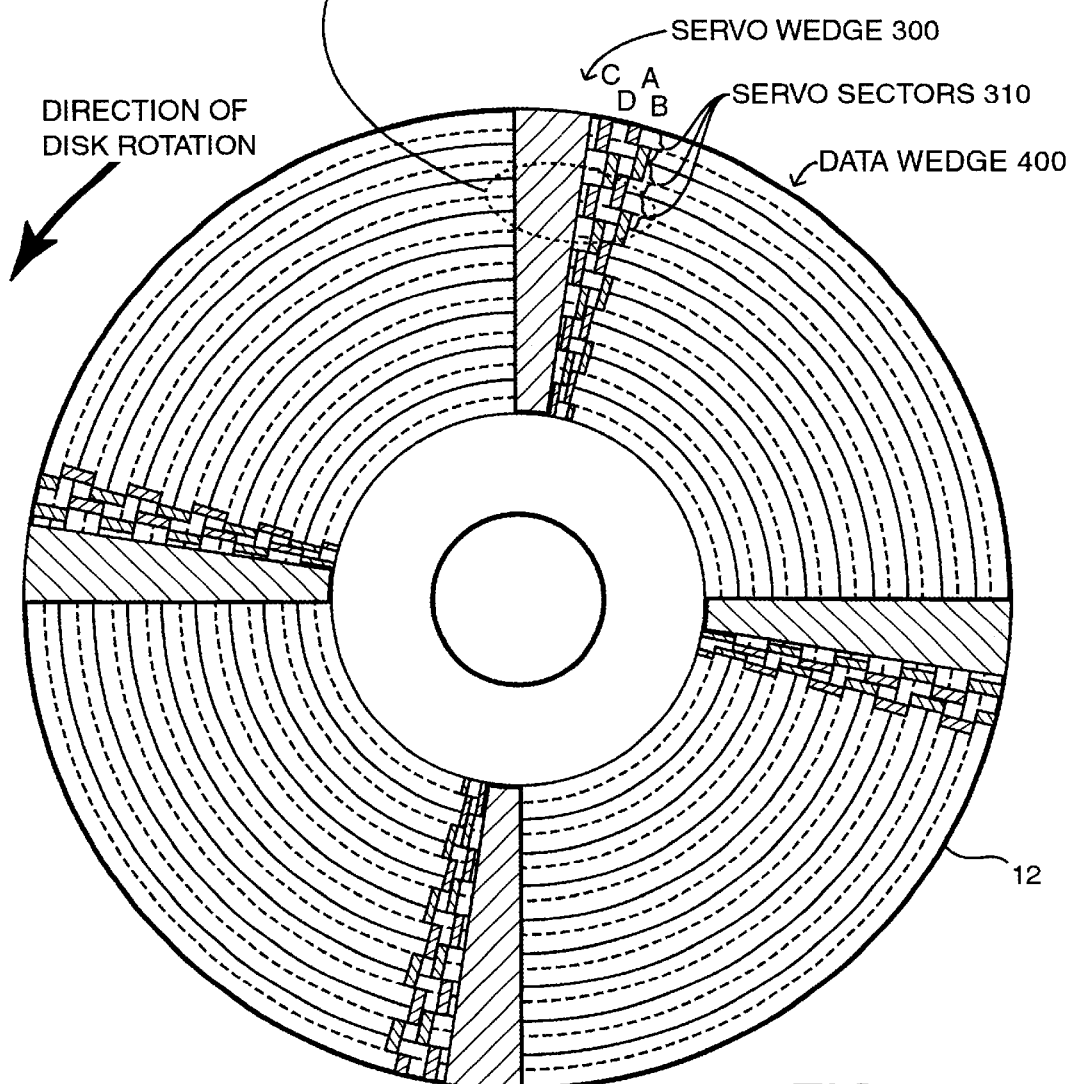
FIG. 2 is a top plan view of a disk containing embedded servo information in the form of servo wedges that are interspersed amongst data wedges, each servo wedge containing a plurality of servo sectors, an annular collection of such servo sectors defining a servo track.

FIG. 2 shows a disk 12 with a plurality of wedge-shaped servo regions or "servo wedges" 300 that are interspersed amongst or "embedded" with a corresponding plurality of wedge-shaped data regions or "data wedges" 400. The area within the data wedges 400, of course, is ultimately used to record data tracks (not shown) that are divided into a plurality of data sectors (not shown). Each data wedge 400 may contain a whole or fractional part of one or more data sectors (not shown). Because the servo information is provided in servo sectors 310, an embedded servo system is sometimes called a "sector servo" system.

An inherent problem with an embedded servo control system is that the servo information occupies disk space that could otherwise contain user data. The more servo wedges 300 on the disk 12, the less space that is available for data storage. Fewer servo wedges 300, though, means that the servo control system is less frequently receiving updates on the head's position. That can be troublesome because a disk drive is constantly subjected to perturbations of varying frequencies that tend to cause the head to move away from a given or predicted position. In the parlance of servo control engineers, less frequent position control updates reduces the "bandwidth" or range of frequencies that can be effectively handled by the servo control system. As should now be clear, there is tension between providing frequent position control information and having as much room as possible for storing the user data. With regard to position control, the more servo wedges there are, the better. With regard to storage capacity, fewer servo wedges are desired. The number of servo wedges chosen is usually driven by bandwidth considerations.

There are normally 50 to 100 servo wedges, or more. For simplicity's sake, however, FIG. 2 shows only four few servo wedges 300 and four data wedges 400. The drawing also exaggerates the angular extent of the servo wedges 300 relative to the data wedges 400. If they were visible to an observer, the servo wedges 300 would appear to be thin, radial spokes since all of them combined would only occupy about 5 to 20 degrees of the disk's 360 degrees.

FIG. 2 further shows that each servo wedge 300 contains a plurality of servo sectors 310. The servo sectors 310 are usually recorded concentrically (as shown) such that one entire rotation of servo sectors 310 defines a circular "servo track." FIG. 2 illustrates nine such servo tracks. In operation, the disk drive's servo control system uses the servo tracks to track follow the data tracks.

Figure 3:
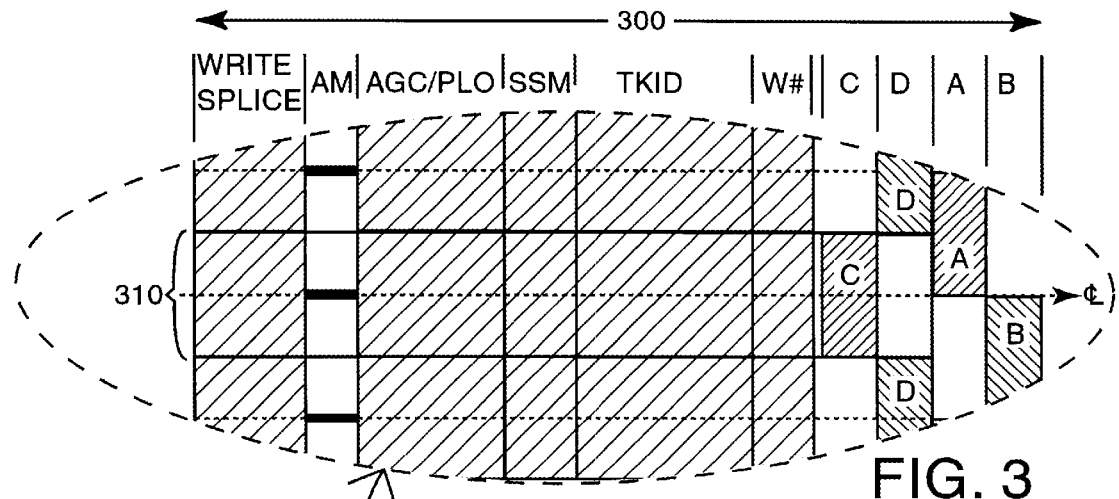
FIG. 3 is a close-up view of the servo information contained in a typical servo sector having two servo bursts that form a burst pair centerline.

FIG. 3 conceptually presents the servo information that may be written in a servo sector 310 within a servo wedge 300, but the relative dimensions of the component fields are not drawn to scale. As shown, each servo wedge 300 contains a circumferential sequence of fields having various functions relative to locating and reading the servo information and implementing the servo control process. More particularly, each servo wedge 300 generally comprises a header region (not separately identified) followed by a plurality of servo bursts that define burst pair centerlines. FIG. 3 shows four servo bursts "A", "B", "C", and "D" that are arranged in a quadrature pattern. One's definition of the radial boundaries of a servo sector may vary somewhat depending on one's point of view. In this particular case, the radial boundaries of the servo sectors 310 are defined relative to the burst pair centerlines. In particular, the "A" and "B" bursts define burst pair centerlines that are at the center of each servo sector or servo track and the "C" and "D" burst define burst pair centerlines that are located at the interface between two adjacent servo sectors or servo tracks.

Regarding the designation of bursts as "A", "B", "C", "D" etc., the burst designation and the order of such designated bursts laid down on the disk is arbitrary and may vary from manufacturer to manufacturer. The invention may be practiced with any convention of burst designation and order.

The header region fields include a setup or write splice field WRITE SPLICE, an address mark field AM, an automatic gain control/phase locked oscillator field AGC/PLO, a servo sync mark field SSM, a track identification field TKID, a wedge number field W#. The header region is followed by servo bursts e.g. A,B,C, and D that are circumferentially sequential and radially offset relative to a burst pair centerline.

The WRITE SPLICE field provides a buffer zone to prevent the servo control system from interpreting an erasure within a preceding user data segment as an address mark field AM. The address mark field AM provides a uniquely modulated segment so that the servo control system may detect the servo sector 300. The address mark field AM is typically created by dc erasing the segment. The AGC/PLO field provides a stable reference to set the gain of the channel and "train" a phase lock oscillator to lock on the servo channel frequency. The servo sync mark SSM field provides a unique coded word which synchronizes decoding logic in the disk drive's read channel (not shown) to either byte or word timing boundaries. The track identification field TKID provides a binary coded track address that uniquely identifies an integer servo track position for coarsely moving the head to a desired servo track ("seeking"). The TKID field conventionally uses a gray code to allow for reading track identification fields while sweeping across multiple servo tracks during seek operations. The wedge number field W# identifies the sequence number of each wedge in the sequence of wedges spaced around the track (e.g. wedge #1 to wedge #78). Lastly, the plurality of circumferentially sequential, radially offset servo bursts (e.g. "A", "B" and "C", "D") provide the servo control system with information needed to determine a fractional track position for keeping the head at a desired position relative to the servo centerline ("track following").

Figure 4:
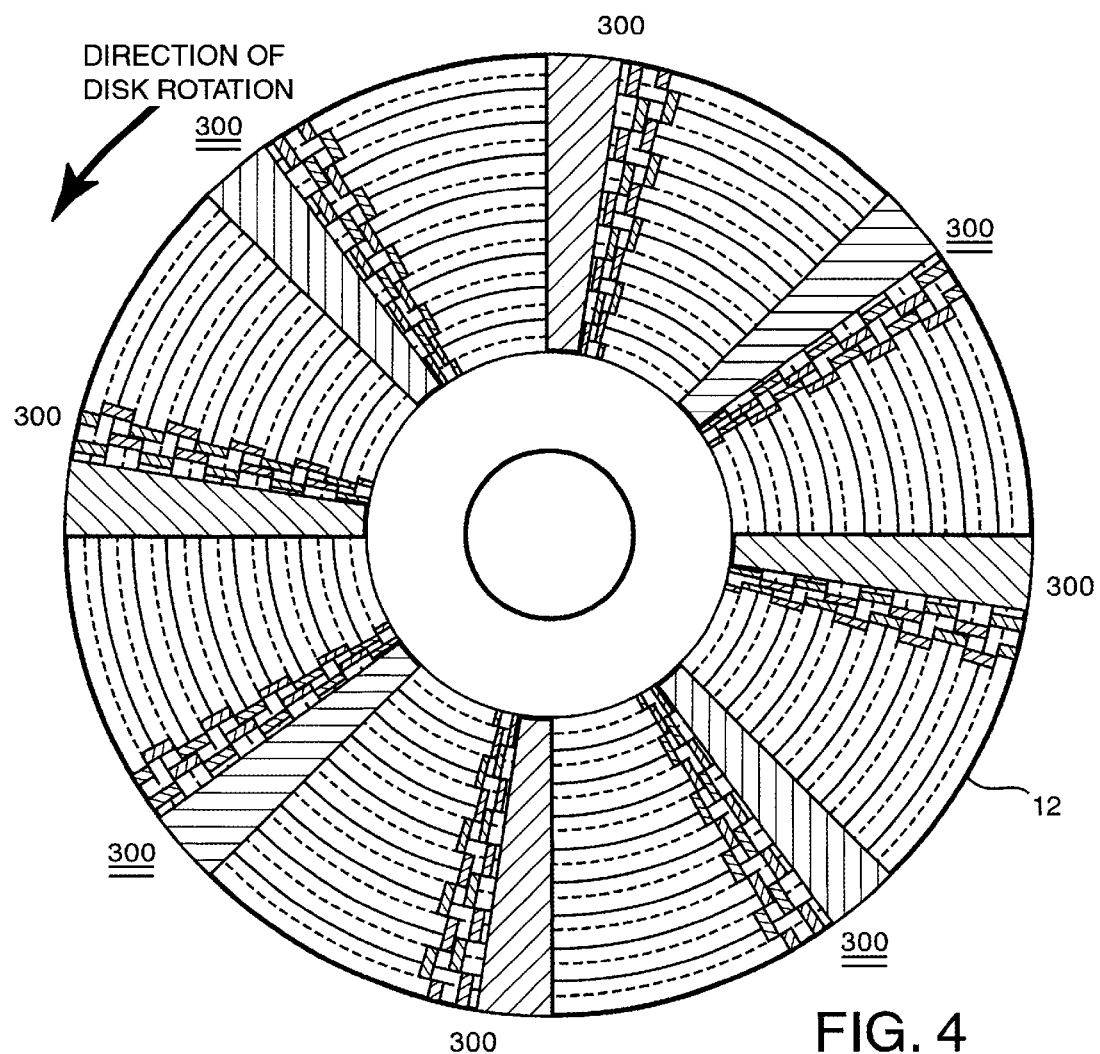
FIG. 4 is a top plan view of a disk that, in additional to the regular servo wedges, has even more servo wedges that increase the servo sampling frequency but reduce the available data area.

As noted above, it is generally desirable to have more servo wedges for shock detection and position control purposes. FIG. 2 illustrates a hypothetical disk having four servo wedges 300. FIG. 4 illustrates one approach that might be taken to increasing the shock detection and position control capabilities relative to FIG. 2. This approach simply involves the embedding of more servo wedges 300 (double underlined) on each disk 12. As is apparent from a comparison of FIG. 4 relative to FIG. 2, however, the additional servo wedges 300 significantly reduces the remaining disk area that is available for storing user data. The '219 patent added more servo wedges 300, as shown in FIG. 4, but eliminates one of the two burst pairs (e.g. "C" and "D") in each servo wedge to provide "small" servo wedges having one burst pair (e.g. "A" and "B"). The approach of the '219 patent is effective, but the continued provision of two bursts projecting from a burst pair centerline within the small servo wedges may not be required as explained below.

As areal density has been increased by increasing the number of tracks per inch (TPI) on the disk, it has become increasingly more likely that a shock event may push a head off-track. If the shock event occurs during a read operation, the drive simply re-reads the data during a subsequent revolution of the disk 12. However, if the shock event occurs during a write operation, it is possible that the head will overwrite the data on an adjacent track. Shock detection during write operations is critical, therefore, in high TPI drives.

Conceptually speaking, shock detection generally consists of rapidly detecting a radial acceleration imparted to the head by comparing the head's radial position at a current servo sector relative to the head's radial position at previous servo sector and, if the difference exceeds a certain threshold, turning off the write gate. Shock detection, in other words, aborts a write operation when it appears that new data is about to be written over old data. The farther apart are the servo sectors, the more likely that it may be "too late" to prevent a destructive overwrite for a shock event of a given magnitude.

Recognizing that a shock event may contain higher frequency components than the perturbations that must be addressed by the servo control system's conventional operating bandwidth, leads to the conclusion that (1) a higher servo frequency is needed to effectively detect radial displacement due to a shock event than is needed for maintaining normal operation and (2) reasonable shock detection may be accomplished with a single burst if that burst is compared with a burst from a previous servo wedge (as adjusted by any pre-established offset between the two bursts). Beneficially, the single burst servo wedges according to the invention are more data space efficient than the "small" wedges disclosed in the '219 patent.

Figure 5:
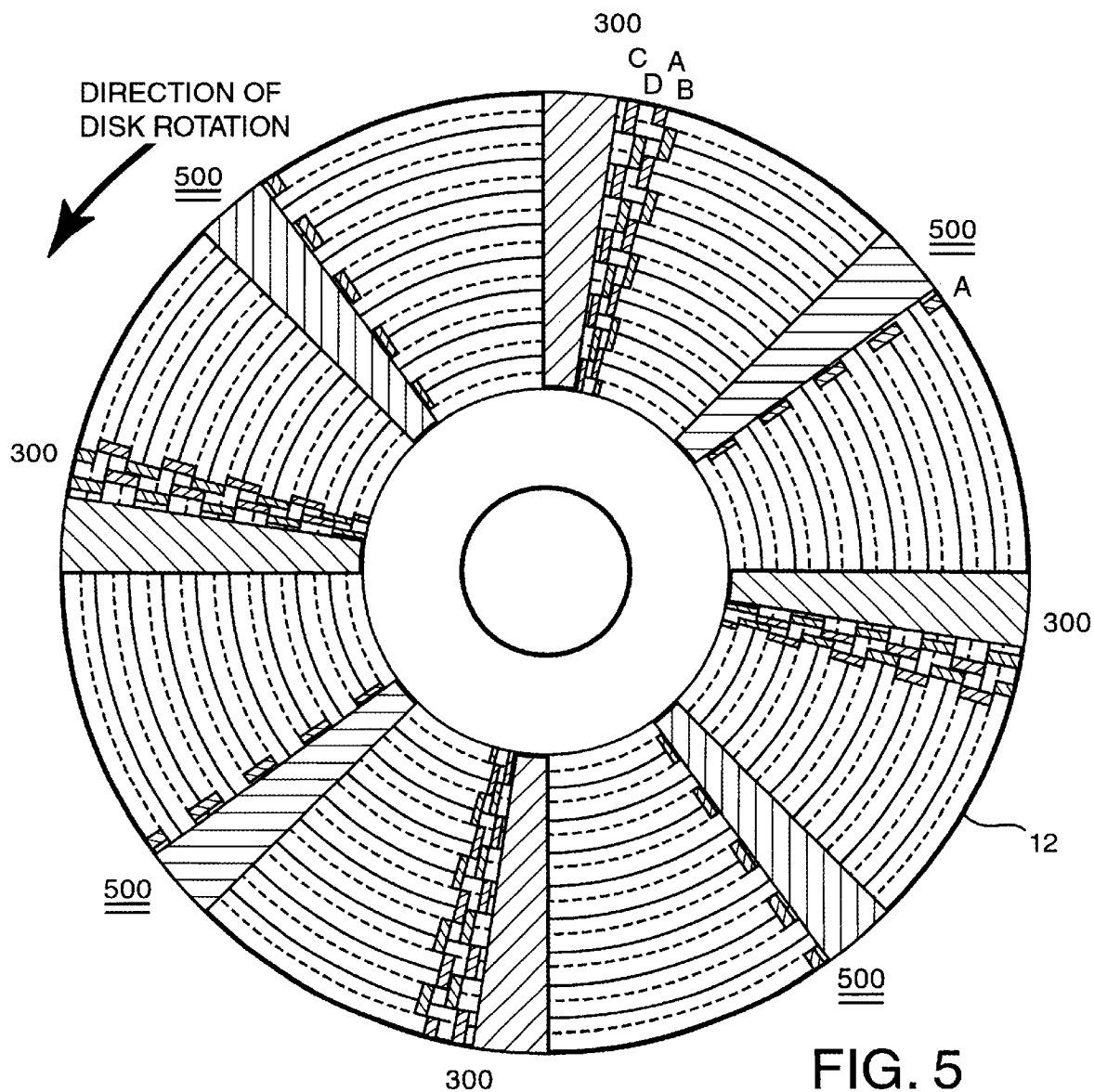
FIG. 5 is a top plan view of a disk that, in additional to the regular servo wedges, has single-burst wedges that contain regular servo header fields and a single servo burst field according to a first embodiment of this invention.

FIG. 5 shows a first embodiment of the invention having servo wedges 500 that include a single burst (an "A" burst is shown) and some of the traditional "header" information found in a standard servo wedge 300. In this embodiment, the single-burst servo wedges 500 includes a write splice field WRITE SPLICE, an address mark field AM, an automatic gain control/phase locked oscillator field AGC/PLO, a track identification field TKID, and a wedge number field W#. This allows for the detection and processing of the single-burst servo wedge 500 in the same manner as a conventional servo wedge 300.

Figure 6:
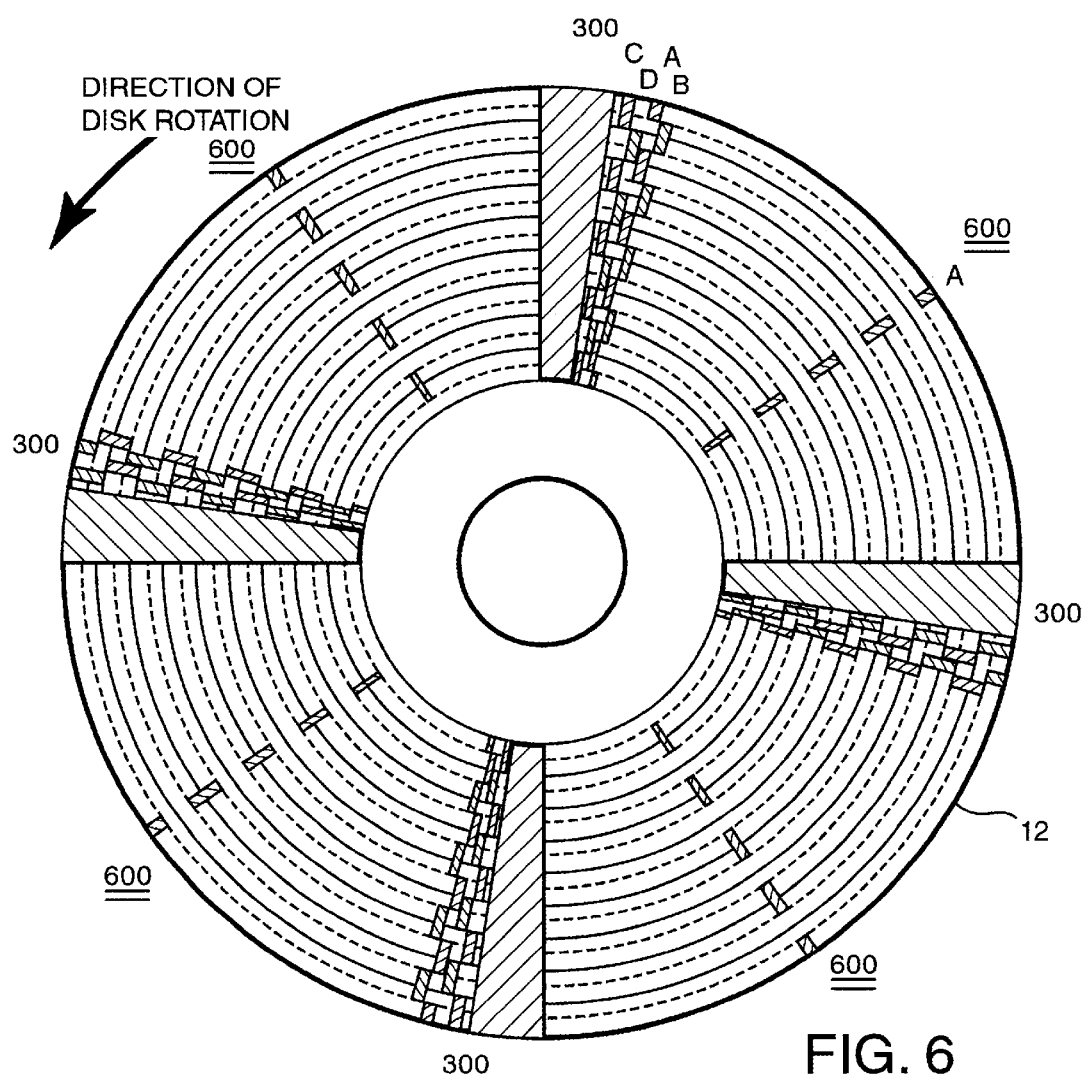
FIG. 6 is a top plan view of a disk that, in additional to the regular servo wedges, has single-burst wedges that only contain a single servo burst field according to a second embodiment of this invention.

FIG. 6 shows a second embodiment of the invention having single-burst servo wedges 600 that literally consists solely of a servo burst field (e.g. an "A" burst field). Here, it is necessary to provide some means of detecting when the head 140 is passing over the single-burst servo wedge 600, without the benefit of the header fields. The inventors contemplate that this could be accomplished by waiting for a measured amount of time relative to a baseline event in the immediately preceding servo wedge 300.

Figure 7:
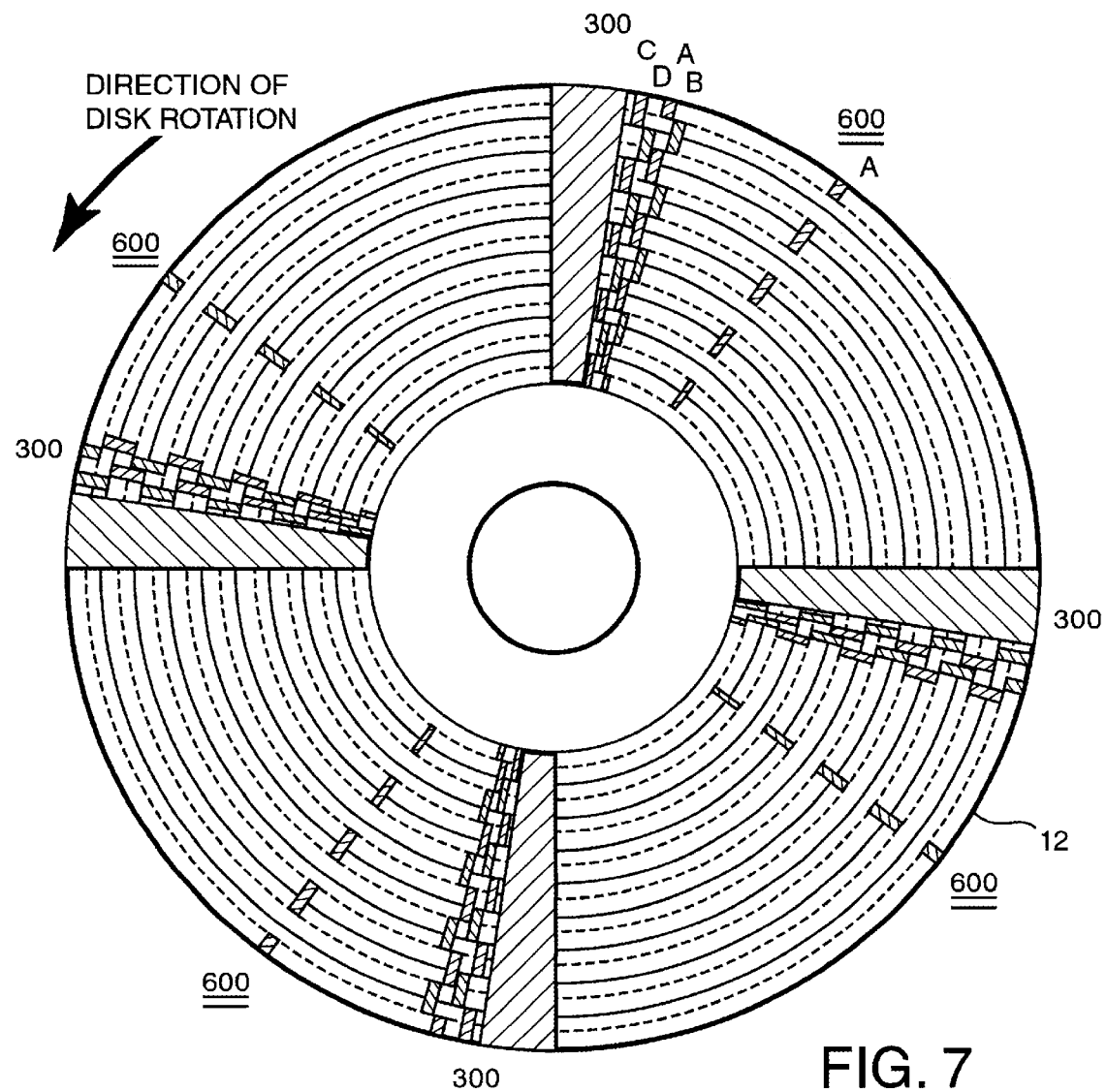
FIG. 7 is a top plan view of a disk having single-burst wedges that are angularly biased toward a preceding servo wedge in order to more quickly detect a shock event.
Figure 8:
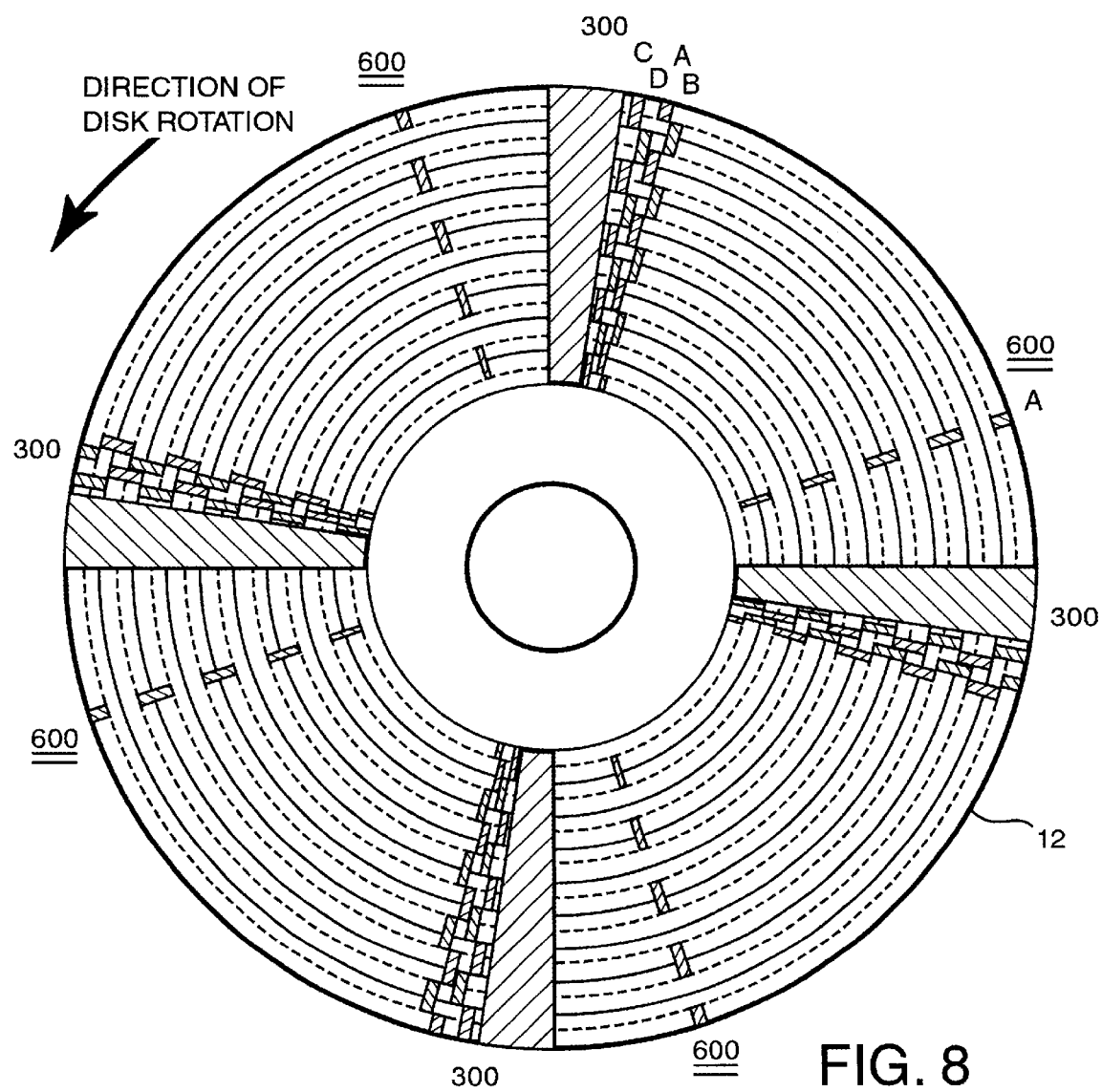
FIG. 8 is a top plan view of a disk having single-burst shock wedges that are angularly biased away from a preceding servo wedge in order to detect a shock event of lesser amplitude.

FIGS. 7 and 8 show how the single-burst servo wedges may be "circumferentially floated" one way or the other—they do not have to be midway between regular servo sectors 300 as shown in FIGS. 5 and 6. The figures show the second embodiment of the single-burst servo wedges 600 for simplicity, but the following concepts apply with equal merit to the single-burst servo wedges 500 of the first embodiment.

In FIG. 7, the single-burst servo wedges 600 are biased toward a preceding servo wedge 300 in order to detect a shock event at an earlier point in time. Detecting the shock event earlier in time makes it more likely that the system will turn off a write operation given a high amplitude shock, but increases the possibility of missing a lower amplitude shock event that moves the write head off-track after is passes by the single-burst servo wedge 600.

In FIG. 8, the single-burst servo wedges 600 are biased away from a preceding servo wedge in order to detect a shock event at a later point in time. Waiting longer increases the system's sensitivity to lower accelerations, but at the possible expense of being too late to prevent an overwrite error in a higher acceleration situation that moves the head off-track before it reaches the single-burst servo wedge 600.

The foregoing description has focused on the use of a single-burst servo wedge for the purpose of increasing shock resistance with a minimal invasion of potential data space. It is also possible, however, to use the single-burst to generate a PES for use by the servo control system. A single burst PES is noisier than a multi-burst PES, but it may still provide useful information.

Figure 9:
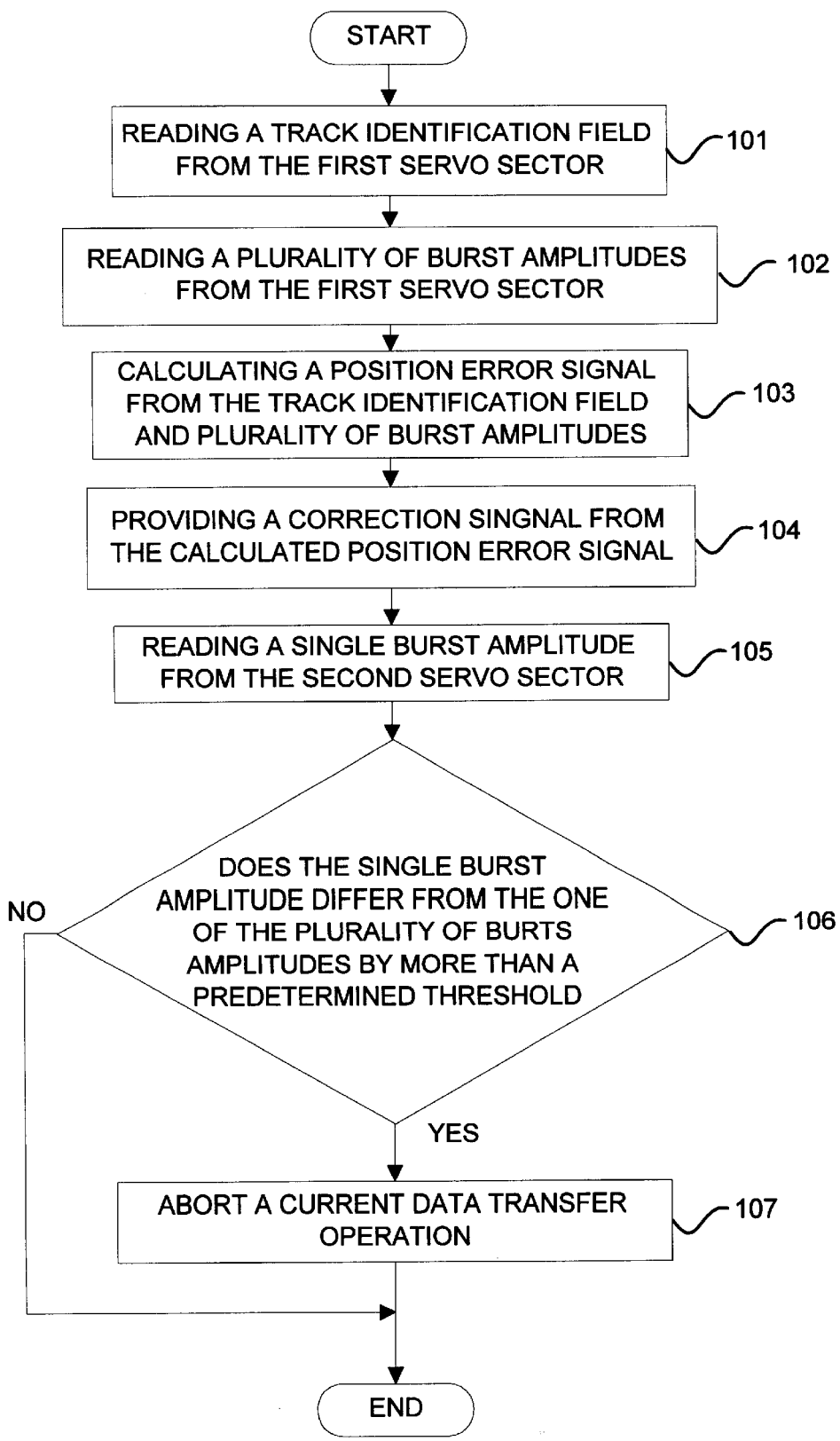
FIG. 9 is a flow chart setting forth the steps of a method of increasing the servo sampling rate for effecting reasonable shock detection in a disk drive having multi-burst servo wedges and single-burst servo wedges.

FIG. 9 is a flow chart setting forth the steps of a method of increasing the servo sampling rate for effecting reasonable shock detection in a disk drive having multi-burst servo wedges and single-burst servo wedges. As shown, the method comprises the steps of reading a track identification field from the first servo sector (step 101); reading a plurality of burst amplitudes from the first servo sector (step 102); calculating a position error signal from the track identification field and the plurality of burst amplitudes (step 103); providing a correction signal from the calculated position error signal (step 104); reading a single burst amplitude from the second servo sector (step 105); comparing the single burst amplitude to one of the plurality of burst amplitudes (step 106); and if the single burst amplitude differs by more than a predetermined threshold amount from the one of the plurality of burst amplitudes, aborting a current disk data transfer operation (step 107).

A number of variations are possible with regard to the single-burst servo wedges of this invention. It may be aligned and dimensioned in any variety of ways with one of the bursts from a preceding servo wedge. For example, the single servo burst may be dimensionally identical to a conventional burst or it may have a non-conventional width or length. As another example, the single-burst servo wedges may all contain a burst other than an "A" burst. As yet another example, alternating ones of the single-burst servo wedges may contain "A" bursts and "C" bursts to provide shock detection where the head is expected to be track following on either an A/B centerline or a C/D centerline (as with an MR head). As yet another example, the bursts do not have to be aligned with preceding bursts, and may be "radially floated" relative to the preceding bursts to account for the fact that the read head may be purposely jogged off-track while writing. Finally, burst near an outer diameter may offset by one amount and bursts near the inner diameter may be offset by another amount to account for the varying amount of jogging that is needed over different parts of the disk.

In another embodiment, the format of the single burst containing servo sector may be altered in accordance with available detection circuitry so that for example, all or part of the header information illustrated could be eliminated or modified to effect an even smaller servo sector. One way to achieve detection of such a truncated servo sector would be to rely on precision timing triggered by detection of a standard servo sector. This method is well known, being commonly applied in what is termed a "soft sector" mode for servo sector detection.

I claim:

1. A disk drive having a disk wherein the disk has a plurality of concentric tracks, each track comprising:
   a first servo sector;
   a second servo sector; and
   a first data region disposed between the first and second servo sectors;
   the first servo sector comprising:
      a synchronization field for establishing gain and frequency settings;
      a track identification field; and
      a plurality of servo bursts for position control; and
   the second servo sector comprising a single servo burst disposed in a predetermined alignment relative to one of the plurality of servo bursts in the first servo sector.

2. The disk drive of claim 1 wherein the second servo sector further comprises servo header fields.

3. The disk drive of claim 2 wherein the servo header fields of the second servo sector comprise an AGC/PLO field.

4. The disk drive of claim 2 wherein the servo header fields of the second servo sector comprise a servo sync mark.

5. The disk drive of claim 1 wherein the plurality of servo bursts of the first servo sector comprise A, B, C and D bursts.

6. The disk drive of claim 5 wherein the single servo burst of the second servo sector comprises an A burst.

7. The disk drive of claim 5 wherein the single servo burst of the second servo sector comprises a B burst.

8. The disk drive of claim 5 wherein the single servo burst of the second servo sector comprises a C burst.

9. The disk drive of claim 5 wherein the single servo burst of the second servo sector comprises a D burst.

10. The disk drive of claim 1 wherein the second servo sector is circumferentially midway between the first servo sector and a next first servo sector.

11. The disk drive of claim 1 wherein the second servo sector is circumferentially closer to the first servo sector than to a next first servo sector.

12. The disk drive of claim 1 wherein the second servo sector is circumferentially farther from the first servo sector than to a next first servo sector.

13. The disk drive of claim 1 wherein the single servo burst of the second sector is radially aligned with the one of the plurality of servo bursts in the first servo sector.

14. The disk drive of claim 1 wherein the single servo burst of the second sector is radially offset relative to the one of the plurality of servo bursts in the first servo sector.

15. The disk drive of claim 1 wherein the single servo burst has the same length and width as each of the plurality of servo bursts in the first servo sector.

16. The disk drive of claim 1 wherein the single servo burst has a different length relative to the plurality of servo bursts in the first servo sector.

17. The disk drive of claim 1 wherein the single servo burst has a different width relative to the plurality of servo bursts in the first servo sector.

18. A method of more frequent servo sampling to improve shock performance while track following in a disk drive having a transducer and a disk with a plurality of concentric tracks wherein each track has a plurality of sequentially active interspersed first and second servo sectors said first servo sector comprising a plurality of servo bursts and said second servo sector comprising a single servo burst wherein the servo sectors are separated by a data region, the method comprising the steps of:
   reading a track identification field from the first servo sector;
   reading a plurality of burst amplitudes from the first servo sector;
   calculating a position error signal from the track identification field and the plurality of burst amplitudes;
   providing a correction signal from the calculated position error signal;
   reading a single burst amplitude from the second servo sector;
   comparing the single burst amplitude to one of the plurality of burst amplitudes; and
   if the single burst amplitude differs by more than a predetermined threshold amount from the one of the plurality of burst amplitudes, aborting a current disk data transfer operation.

19. The method including the disk drive of claim 18 wherein the second servo sector further comprises servo header fields.

20. The method including the disk drive of claim 19 wherein the servo header fields of the second servo sector comprise an AGC/PLO field.

21. The method including the disk drive of claim 19 wherein the servo header fields of the second servo sector comprise a servo sync mark.

22. The method including the disk drive of claim 18 wherein the plurality of servo bursts of the first servo sector comprise A, B, C and D bursts.

23. The method including the disk drive of clam 22 wherein the single servo burst of the second servo sector comprises an A burst.

24. The method including the disk drive of claim 22 wherein the single servo burst of the second servo sector comprises a B burst.

25. The method including the disk drive of claim 22 wherein the single servo burst of the second servo sector comprises a C burst.

26. The method including the disk drive of claim 22 wherein the single servo burst of the second servo sector comprises a D burst.

27. The method including the disk drive of claim 18 wherein the second servo sector is circumferentially midway between the first servo sector and a next first servo sector.

28. The method including the disk drive of claim 18 wherein the second servo sector is circumferentially closer to the first servo sector than to a next first servo sector.

29. The method including the disk drive of claim 18 wherein the second servo sector is circumferentially farther from the first servo sector than to a next first servo sector.

30. The method including the disk drive of claim 18 wherein the single servo burst of the second sector is radially aligned with the one of the plurality of servo bursts in the first servo sector.

31. The method including the disk drive of claim 18 wherein the single servo burst of the second sector is radially offset relative to the one of the plurality of servo bursts in the first servo sector.

32. The method including the disk drive of claim 18 wherein the single servo burst has the same length and width as each of the plurality of servo bursts in the first servo sector.

33. The method including the disk drive of claim 18 wherein the single servo burst has a different length relative to the plurality of servo bursts in the first servo sector.

34. The method including the disk drive of claim 18 wherein the single servo burst has a different width relative to the plurality of servo bursts in the first servo sector.

* * * * *